(12) United States Patent
Yan (10) Patent No.: US 11,321,308 B2
(45) Date of Patent: May 3, 2022

(54) ASSET MANAGEMENT METHOD AND APPARATUS, AND ELECTRONIC DEVICE

(71) Applicant: Advanced New Technologies Co., Ltd., Grand Cayman (KY)

(72) Inventor: Xuebing Yan, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/725,236

(22) Filed: Dec. 23, 2019

(65) Prior Publication Data

US 2020/0133944 A1 Apr. 30, 2020

Related U.S. Application Data

(63) Continuation of application No. 16/275,440, filed on Feb. 14, 2019.

(30) Foreign Application Priority Data

Feb. 14, 2018 (CN) .......................... 201810151590.6

(51) Int. Cl.
*G06F 16/23* (2019.01)
*G06F 16/27* (2019.01)
(Continued)

(52) U.S. Cl.
CPC .......... *G06F 16/2379* (2019.01); *G06F 16/27* (2019.01); *G06Q 10/00* (2013.01);
(Continued)

(58) Field of Classification Search
CPC ........ G06Q 20/40; G06Q 20/06; G06Q 20/24; G06Q 10/00; G06Q 20/12; G06Q 20/223;
(Continued)

(56) References Cited

U.S. PATENT DOCUMENTS 8,832,059 B2 9/2014 Baran
9,342,697 B1 5/2016 Ren et al.
(Continued)

FOREIGN PATENT DOCUMENTS

CN 106656974 5/2017
CN 106815764 6/2017
(Continued)

OTHER PUBLICATIONS

Chen et al., "Blockchain-based Payment Collection Supervision System using Pervasive Bitcoin Digital Wallet," Fifth International Workshop on Pervasive and Contect-Aware Middleware, Oct. 2017, 8 pages.

(Continued)

*Primary Examiner* — Giovanna B Colan
(74) *Attorney, Agent, or Firm* — Fish & Richardson P.C.

(57) ABSTRACT

This specification describes techniques for managing assets in a blockchain. One example method includes receiving, from a target user recorded in a distributed database of a blockchain network, a user input including a request to transfer a plurality of asset objects including digital assets corresponding to physical assets associated with the target user, in response to receiving the request, combining the plurality of asset objects in a target object, the target object including an address field used to maintain address information of the plurality of asset objects, deleting address information corresponding to the plurality of asset objects from the target object, and adding the address information to asset receiving objects corresponding to the plurality of asset objects.

20 Claims, 4 Drawing Sheets

(51) Int. Cl.
  *G06Q 20/22* (2012.01)
  *G06Q 10/00* (2012.01)
  *G06Q 20/12* (2012.01)
  *H04L 9/06* (2006.01)
  *H04L 9/30* (2006.01)
  *G06Q 20/40* (2012.01)

(52) U.S. Cl.
  CPC ........... *G06Q 20/12* (2013.01); *G06Q 20/223* (2013.01); *H04L 9/0637* (2013.01); *H04L 9/30* (2013.01); *G06Q 20/401* (2013.01); *G06Q 2220/00* (2013.01); *H04L 2209/38* (2013.01)

(58) Field of Classification Search
  CPC . H04L 9/06; H04L 9/0637; H04L 9/30; G06F 16/2379; G06F 16/27
  USPC ........................................................ 707/703
  See application file for complete search history.

(56) References Cited

U.S. PATENT DOCUMENTS

| | | | |
|---|---|---|---|
| 10,102,082 | B2 | 10/2018 | Cabrera et al. |
| 10,204,349 | B2 | 2/2019 | McCauley et al. |
| 10,564,820 | B1 | 2/2020 | Cabanero et al. |
| 2002/0109737 | A1 | 8/2002 | Jaeger |
| 2003/0233370 | A1 | 12/2003 | Barabas et al. |
| 2008/0320024 | A1 | 12/2008 | Thirumalai et al. |
| 2014/0279942 | A1 | 9/2014 | Siepmann et al. |
| 2015/0244690 | A1 | 8/2015 | Mossbarger |
| 2015/0262176 | A1* | 9/2015 | Langschaedel ...... G06Q 20/363 705/71 |
| 2015/0379510 | A1 | 12/2015 | Smith |
| 2016/0012424 | A1 | 1/2016 | Simon et al. |
| 2016/0151715 | A1 | 6/2016 | Polansky et al. |
| 2016/0196324 | A1 | 7/2016 | Haviv et al. |
| 2016/0283920 | A1 | 9/2016 | Fisher et al. |
| 2016/0292672 | A1 | 10/2016 | Fay et al. |
| 2017/0005804 | A1 | 1/2017 | Zinder |
| 2017/0033932 | A1 | 2/2017 | Truu et al. |
| 2017/0048209 | A1 | 2/2017 | Lohe et al. |
| 2017/0048235 | A1 | 2/2017 | Lohe et al. |
| 2017/0103468 | A1 | 4/2017 | Orsini et al. |
| 2017/0116693 | A1 | 4/2017 | Rae et al. |
| 2017/0132630 | A1* | 5/2017 | Castinado ............ G06Q 20/382 |
| 2017/0140408 | A1* | 5/2017 | Wuehler ............ G06Q 30/0207 |
| 2017/0161733 | A1 | 6/2017 | Koletsky et al. |
| 2017/0221052 | A1* | 8/2017 | Sheng ................ G06Q 20/3829 |
| 2017/0232300 | A1 | 8/2017 | Tran et al. |
| 2017/0286880 | A1 | 10/2017 | Wiig et al. |
| 2017/0315882 | A1 | 11/2017 | Yammine et al. |
| 2017/0344987 | A1 | 11/2017 | Davis et al. |
| 2017/0353309 | A1 | 12/2017 | Gray |
| 2018/0005186 | A1 | 1/2018 | Hunn |
| 2018/0018723 | A1 | 1/2018 | Nagla et al. |
| 2018/0075527 | A1 | 3/2018 | Nagla et al. |
| 2018/0089183 | A1 | 3/2018 | Schwartz et al. |
| 2018/0089256 | A1 | 3/2018 | Wright, Sr. |
| 2018/0089759 | A1* | 3/2018 | Stradling ............ H04L 9/3297 |
| 2018/0089760 | A1 | 3/2018 | Stradling et al. |
| 2018/0089761 | A1 | 3/2018 | Stradling et al. |
| 2018/0091316 | A1* | 3/2018 | Stradling ............ H04L 9/3236 |
| 2018/0091514 | A1 | 3/2018 | Schwartz et al. |
| 2018/0167198 | A1 | 6/2018 | Muller et al. |
| 2018/0218176 | A1* | 8/2018 | Voorhees ............ H04L 9/3213 |
| 2018/0247191 | A1* | 8/2018 | Katz ........................ G06N 3/08 |
| 2018/0253702 | A1 | 9/2018 | Dowding |
| 2018/0285996 | A1 | 10/2018 | Ma et al. |
| 2018/0309567 | A1* | 10/2018 | Wooden ................ H04L 9/3239 |
| 2018/0329693 | A1 | 11/2018 | Eksten et al. |
| 2018/0330342 | A1 | 11/2018 | Prakash et al. |
| 2019/0012249 | A1* | 1/2019 | Mercuri ................ G06Q 20/308 |
| 2019/0013948 | A1 | 1/2019 | Mercuri et al. |
| 2019/0026821 | A1 | 1/2019 | Bathen et al. |
| 2019/0028276 | A1 | 1/2019 | Pierce et al. |
| 2019/0036906 | A1 | 1/2019 | Biyani et al. |
| 2019/0080402 | A1 | 3/2019 | Molinari et al. |
| 2019/0122155 | A1 | 4/2019 | Irazabal et al. |
| 2019/0147431 | A1* | 5/2019 | Galebach ............. H04L 9/3247 705/44 |
| 2019/0149453 | A1 | 5/2019 | Kephart et al. |
| 2019/0164153 | A1 | 5/2019 | Agrawal et al. |
| 2019/0172298 | A1 | 6/2019 | Just |
| 2019/0222567 | A1 | 7/2019 | Caldera et al. |
| 2019/0228386 | A1* | 7/2019 | Onnainty ............ G06Q 20/065 |
| 2019/0236598 | A1 | 8/2019 | Padmanabhan |
| 2019/0236606 | A1 | 8/2019 | Padmanabhan et al. |
| 2019/0238316 | A1 | 8/2019 | Padmanabhan |
| 2019/0238525 | A1 | 8/2019 | Padmanabhan et al. |
| 2019/0251075 | A1 | 8/2019 | Yan |
| 2019/0251076 | A1 | 8/2019 | Yan |
| 2019/0251078 | A1 | 8/2019 | Yan |
| 2019/0251079 | A1 | 8/2019 | Yan |
| 2019/0251563 | A1 | 8/2019 | Yan |
| 2019/0253257 | A1 | 8/2019 | Yan |
| 2019/0303579 | A1 | 10/2019 | Reddy et al. |
| 2019/0339678 | A1 | 11/2019 | Biernat et al. |
| 2019/0377806 | A1 | 12/2019 | Padmanabhan et al. |
| 2020/0034127 | A1 | 1/2020 | Burrowes et al. |
| 2020/0037158 | A1 | 1/2020 | Soundararajan et al. |
| 2020/0051176 | A1 | 2/2020 | Liu et al. |

FOREIGN PATENT DOCUMENTS

| | | |
|---|---|---|
| CN | 106845960 | 6/2017 |
| CN | 106874087 | 6/2017 |
| CN | 107145768 | 9/2017 |
| CN | 107220820 | 9/2017 |
| CN | 107239940 | 10/2017 |
| CN | 107273759 | 10/2017 |
| CN | 107301536 | 10/2017 |
| CN | 107615317 | 1/2018 |
| JP | 6224283 | 11/2017 |
| JP | 2019500699 | 1/2019 |
| JP | 2019514099 | 5/2019 |
| KR | 101751025 | 6/2017 |
| TW | M543413 | 6/2017 |
| TW | 201732666 | 9/2017 |
| TW | 201732705 | 9/2017 |
| TW | 201732706 | 9/2017 |
| TW | 201741955 | 12/2017 |
| TW | 201800997 | 1/2018 |
| TW | M555500 | 2/2018 |
| WO | WO 2017091530 | 6/2017 |
| WO | WO 2017145018 | 8/2017 |
| WO | WO 2017163220 | 9/2017 |
| WO | WO 2017170912 | 10/2017 |
| WO | WO 2017170997 | 10/2017 |
| WO | WO 2017190175 | 11/2017 |
| WO | WO 2017223470 | 12/2017 |

OTHER PUBLICATIONS

Crosby et al., "BlockChain Technology: Beyond Bitcoin," Sutardja Center for Entrepreneurship & Technology Technical Report, Oct. 16, 2015, 35 pages.
International Search Report and Written Opinion in International Application No. PCT/US2019/017946, dated May 7, 2019, 11 pages.
International Search Report and Written Opinion in International Application No. PCT/US2019/017951, dated May 14, 2019, 7 pages.
International Search Report and Written Opinion in International Application No. PCT/US2019/017956, dated May 14, 2019, 7 pages.
International Search Report and Written Opinion in International Application No. PCT/US2019/017958, dated May 1, 2019, 8 pages.
International Search Report and Written Opinion in International Application No. PCT/US2019/017980, dated May 2, 2019, 9 pages.
International Search Report and Written Opinion in International Application No. PCT/US2019/017986, dated May 1, 2019, 9 pages.

(56) References Cited

OTHER PUBLICATIONS

Nakamoto, "Bitcoin: A Peer-to-Peer Electronic Cash System," www.bitcoin.org, 2005, 9 pages.
Binance.vision [online], "Proof of Burn Explained", Binance Academy, 2017, retrieved on Feb. 23, 2020, retrieved from URL <https://www.binance.vision/ja/blockchain/proof-of-burn-explained>, 7 pages (with partial English translation).
U.S. Appl. No. 16/275,403, filed Feb. 14, 2019, Yan
U.S. Appl. No. 16/724,642, filed Dec. 23, 2019, Yan.
U.S. Appl. No. 16/275,444, filed Feb. 14, 2019, Yan.
U.S. Appl. No. 16/724,785, filed Dec. 23, 2019, Yan.
U.S. Appl. No. 16/275,505, filed Feb. 14, 2019, Yan.
U.S. Appl. No. 16/725,918, filed Dec. 23, 2019, Yan.
U.S. Appl. No. 16/275,811, filed Feb. 14, 2019, Yan.
U.S. Appl. No. 16/723,313, filed Dec. 20, 2019, Yan.
U.S. Appl. No. 16/275,868, filed Feb. 14, 2019, Yan.
U.S. Appl. No. 16/725,686, filed Dec. 23, 2019, Yan.
PCT International Preliminary Report on Patentability in International Application No. PCT/US2019/017951, dated Aug. 27, 2020, 7 pages.
Eips.ethereum.org [online], "EIP-721: ERC-721 Non-Fungible Token Standard," Jan. 2018, retrieved on May 7, 2021, retrieved from URL <https://eips.ethereum.org/EIPS/eip-721>, 14 pages.
Preethikasireddy.com [online], "How does Ethereum work, anyway?" Sep. 2017, retrieved on May 7, 2021, retrieved from URL <https://www.preethikasireddy.com/post/how-does-ethereum-work-anyway>, 41 pages.
Blockchain Technology: Prospects and Implications of the Industry and Society, Software Policy & Research Institute, Issue Report, Sep. 22, 2017, No. 2017-004 (with partial English translation).
Office Action in U.S. Appl. No. 16/275,440, dated Nov. 1, 2021, 70 pages.

\* cited by examiner

ASSET MANAGEMENT METHOD AND APPARATUS, AND ELECTRONIC DEVICE

CROSS-REFERENCE TO RELATED APPLICATIONS

This application is a continuation of and claims priority to U.S. application Ser. No. 16/275,440 filed Feb. 14, 2019, which U.S. application claims priority to Chinese Patent Application No. 201810151590.6, filed on Feb. 14, 2018. The contents of the prior U.S. and Chinese applications are hereby incorporated by reference in their entirety.

TECHNICAL FIELD

One or more implementations of the present specification relate to the field of blockchain technologies, and in particular, to an asset management method and apparatus, and an electronic device.

BACKGROUND

A blockchain technology is an emerging technology that several computing devices jointly participate in "transaction recording" and jointly maintain a complete distributed database. The blockchain technology is characterized by decentralization, openness, and transparency, each computing device can participate in database recording, and data synchronization can be quickly performed between computing devices. Therefore, the blockchain technology is used to set up a decentralized system, and various execution programs are recorded and automatically executed in a distributed database of a blockchain. The blockchain technology has been widely used in many fields. For example, in the field of financial technology, the blockchain technology is used to set up a P2P payment platform and deploy execution programs such as smart contracts in the blockchain, thereby implementing point-to-point secure payment between different users without using financial institutions such as a bank.

SUMMARY

The present specification provides an asset management method, including the following: receiving, by a node device in a blockchain, an asset object transfer request, where the asset object transfer request includes a plurality of asset objects to be transferred; and in response to the asset object transfer request, combining the plurality of asset objects into a target asset object, deleting address information of the plurality of asset objects from target objects holding the plurality of asset objects, and adding address information of the target asset object to asset receiving objects corresponding to the plurality of asset objects.

Optionally, the plurality of asset objects include the target asset object specified by a target user.

The combining the plurality of asset objects into a target asset object includes the following: adding address information of one or more asset objects other than the target asset object in the plurality of asset objects to the target asset object.

Optionally, the asset object transfer request includes an asset type specified by a target user, and a smart contract object corresponding to the specified asset type is deployed in the blockchain.

The combining the plurality of asset objects into a target asset object includes the following: invoking the smart contract object corresponding to the asset type specified by the target user, to create the target asset object; and adding the address information of the plurality of asset objects to the target asset object.

Optionally, a smart contract object corresponding to an asset type of the target asset object is deployed in the blockchain, the smart contract object declares an execution program used to transfer an asset object, and the target asset object is created by invoking the corresponding smart contract object.

The deleting address information of the plurality of asset objects from target objects holding the plurality of asset objects, and adding address information of the target asset object to asset receiving objects corresponding to the plurality of asset objects includes the following: invoking the execution program declared in the smart contract object that corresponds to the asset type of the target asset object and that is deployed in the blockchain, and determining whether the asset object transfer request satisfies a predetermined transfer rule; and if the asset object transfer request satisfies the predetermined transfer rule, deleting the address information of the plurality of asset objects from the target objects holding the plurality of asset objects, and adding the address information of the target asset object to an asset receiving object corresponding to the target asset object.

Optionally, an object supported by the blockchain includes an address field, and the address field is used to maintain address information of an asset object held by the object.

Optionally, the deleting address information of the plurality of asset objects from target objects holding the plurality of asset objects, and adding address information of the target asset object to asset receiving objects corresponding to the plurality of asset objects includes the following: deleting the address information of the plurality of asset objects from the address fields in the target objects holding the plurality of asset objects, and adding the address information of the target asset object to an address field in an asset receiving object corresponding to the target asset object.

Optionally, an object supported by the blockchain further includes a code field, and the code field is used to maintain execution code related to an execution program declared in the object.

Optionally, an asset receiving object corresponding to the target asset object includes the following: an asset receiving object that is specified by a user and that corresponds to the target asset object; or an asset receiving object that is declared in a smart contract object corresponding to an asset type of the target asset object and that corresponds to the target asset object.

Optionally, an object supported by the blockchain includes an account object, a smart contract object, and an asset object; and the asset receiving object corresponding to the target asset object includes any one of an account object, a smart contract object, and an asset object.

Optionally, the blockchain is a consortium blockchain, and a target member (user) in the blockchain is a consortium member having the right of creating an asset object in the consortium blockchain.

The present specification further provides an asset management apparatus, including the following: a receiving module, configured to enable a node device in a blockchain to receive an asset object transfer request, where the asset object transfer request includes a plurality of asset objects to be transferred; a combination module, in response to the asset object transfer request, configured to combine the plurality of asset objects into a target asset object; and a transfer module, configured to remove address information of the plurality of asset objects from target objects holding the plurality of asset objects, and add address information of the target asset object to asset receiving objects corresponding to the plurality of asset objects.

Optionally, the plurality of asset objects include the target asset object specified by a target user.

The combination module is configured to: add address information of one or more asset objects other than the target asset object in the plurality of asset objects to the target asset object.

Optionally, the asset object transfer request includes an asset type specified by a target user, and a smart contract object corresponding to the specified asset type is deployed in the blockchain.

The combination module is configured to: invoke the smart contract object corresponding to the asset type specified by the target user, to create the target asset object; and add the address information of the plurality of asset objects to the target asset object.

Optionally, a smart contract object corresponding to an asset type of the target asset object is deployed in the blockchain, the smart contract object declares an execution program used to transfer an asset object, and the target asset object is created by invoking the corresponding smart contract object.

The transfer module is configured to: invoke the execution program declared in the smart contract object that corresponds to the asset type of the target asset object and that is deployed in the blockchain, and determine whether the asset object transfer request satisfies a predetermined transfer rule; and if the asset object transfer request satisfies the predetermined transfer rule, remove the address information of the plurality of asset objects from the target objects holding the plurality of asset objects, and add the address information of the target asset object to an asset receiving object corresponding to the target asset object.

Optionally, an object supported by the blockchain includes an address field, and the address field is used to maintain address information of an asset object held by the object.

Optionally, the transfer module is further configured to: remove the address information of the plurality of asset objects from the address fields in the target objects holding the plurality of asset objects, and add the address information of the target asset object to an address field in an asset receiving object corresponding to the target asset object.

Optionally, an object supported by the blockchain further includes a code field, and the code field is used to maintain execution code related to an execution program declared in the object.

Optionally, an asset receiving object corresponding to the target asset object includes: an asset receiving object that is specified by a user and that corresponds to the target asset object; or an asset receiving object that is declared in a smart contract object corresponding to an asset type of the target asset object and that corresponds to the target asset object.

Optionally, an object supported by the blockchain includes an account object, a smart contract object, and an asset object; and the asset receiving object corresponding to the target asset object includes any one of an account object, a smart contract object, and an asset object.

Optionally, the blockchain is a consortium blockchain, and a target member in the blockchain is a consortium member having the right of creating an asset object in the consortium blockchain.

The present specification further provides an electronic device, including the following: a processor; and a memory, configured to store an executable machine instruction.

By reading and executing an executable machine instruction that is stored in the memory and that corresponds to control logic of blockchain-based asset management, the processor is configured to: enable a node device in a blockchain to receive an asset object transfer request, where the asset object transfer request includes a plurality of asset objects to be transferred; and in response to the asset object transfer request, combine the plurality of asset objects into a target asset object, remove address information of the plurality of asset objects from target objects holding the plurality of asset objects, and add address information of the target asset object to asset receiving objects corresponding to the plurality of asset objects.

In the described implementations, the plurality of asset objects specified by the user are combined into the target asset object, the address information of the plurality of asset objects is removed from the target objects holding the plurality of asset objects, and the address information of the target asset object is added to the receiving object holding the target asset object, to transfer the target asset object, so that assets in the real world can be converted into digital assets in the blockchain and held, and online combination and transfer of the assets can be completed based on the blockchain.

DESCRIPTION OF IMPLEMENTATIONS

The present specification is intended to disclose a technical solution of completing asset object combination and asset object transfer in a distributed ledger system, such as a blockchain network.

During implementation, a target member in the blockchain can deploy a smart contract object (smart contract) corresponding to an asset type of an asset object in the blockchain in advance. The created smart contract object is used for asset object management. A user accessing a blockchain can create an asset object in the blockchain by invoking the previous smart contract object, and complete online management on the held asset object in the blockchain.

When creating the asset object, the user accessing the blockchain can initiate an asset object create request to the blockchain to invoke the previous smart contract object for asset object creation, and then add address information of the created asset object to a target object holding the asset object. For example, an execution program used to create an asset object can be declared in the smart contract object in advance, so that the asset object can be created by invoking the previous execution program used to create an asset object.

In addition, the user accessing the blockchain can initiate an asset object transfer request to the blockchain when a plurality of held asset objects are to be transferred. After receiving the asset object transfer request, in response to the asset object transfer request, a node device in the blockchain can combine the plurality of asset objects into a target asset object; and after combination of the plurality of asset objects into the target asset object, remove address information of the plurality of asset objects from target objects holding the plurality of asset objects, and add address information of the target asset object to an asset receiving object corresponding to the target asset object, to complete online asset object transfer.

It can be learned from the previous implementations that the plurality of asset objects specified by the user are combined into the target asset object, the address information of the plurality of asset objects is removed from the target objects holding the plurality of asset objects, and the address information of the target asset object is added to the receiving object holding the target asset object, to transfer the target asset object, so that assets in the real world can be converted into digital assets in the blockchain and held, and online combination and transfer of the assets can be completed based on the blockchain.

The following describes the present specification with reference to specific application scenarios by using specific implementations.

Figure 1:
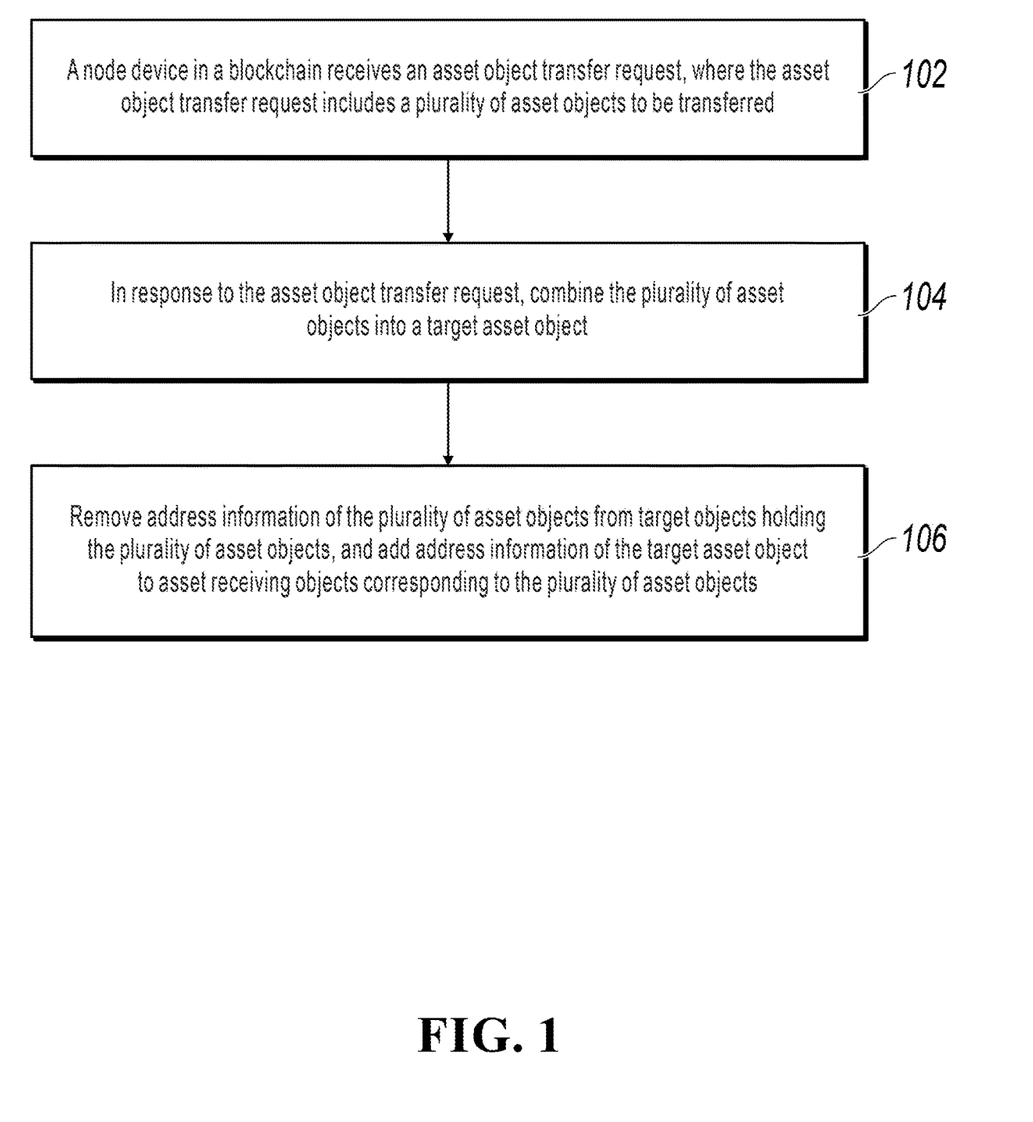
FIG. 1 is a flowchart illustrating an asset management method, according to an example implementation.

FIG. 1 illustrates an asset management method, according to an implementation of the present specification. The method is applied to a node device in a blockchain, and includes the following steps:

Step 102: The node device in the blockchain receives an asset object transfer request, where the asset object transfer request includes a plurality of asset objects to be transferred.

Step 104: In response to the asset object transfer request, combine the plurality of asset objects into a target asset object.

Step 106: Remove address information of the plurality of asset objects from target objects holding the plurality of asset objects, and add address information of the target asset object to asset receiving objects corresponding to the plurality of asset objects.

The blockchain described in the present specification can include any type of blockchain networks that can support an asset object.

For example, a conventional blockchain usually only supports an account object and a smart contract object. However, in the present specification, an object supported by the blockchain can be extended, and further includes an asset object in addition to the account object and the smart contract object currently supported by the blockchain.

It is worthwhile to note that a type of the blockchain described in the present specification is not particularly limited, and the blockchain can be a consortium blockchain or another type of blockchain different from the consortium blockchain (for example, a private blockchain or a public blockchain).

The smart contract object can include a smart contract program deployed in the blockchain by a target member in the blockchain and recorded in a distributed database of the blockchain (a blockchain ledger). The smart contract program is used to manage an asset object supported by the blockchain. A user accessing a blockchain can invoke the smart contract object to create an asset object in the blockchain, and complete online management of the held asset object in the blockchain.

For example, the blockchain can be a consortium blockchain constituted by several financial institutions serving as consortium members. In this case, the target member in the blockchain can be a financial institution serving as a consortium member in the consortium blockchain and having the right of creating an asset object. A distributed smart contract platform can be set up by using the consortium blockchain. An operator of the smart contract platform can extend an object type supported by the smart contract platform, and the object further includes an asset object in addition to the currently supported account object and smart contract object, so that a financial institution serving as a consortium member can create a new asset type in the platform by deploying a smart contract (smart contract object) in the blockchain. Therefore, a user accessing a blockchain can invoke the smart contract to create an asset object, and complete online management of the held asset object.

It is worthwhile to note that in the present specification, a request initiated in the blockchain by the user accessing the blockchain can be a transfer used in the conventional blockchain.

For example, the user accessing the blockchain can initiate a transfer used to create an asset object in the blockchain, to invoke the smart contract object that has been deployed in the blockchain to create the asset object, or can initiate a transfer used to update a state of an asset object in the blockchain, to invoke the smart contract object that has been deployed in the blockchain to update the state of the asset object.

In some implementations, the request initiated in the blockchain by the user accessing the blockchain can be of another type different from a transfer, for example, an instruction or a message having a standard data structure, and is not particularly limited in the present specification. In the following implementations, descriptions are provided by using an example that the request initiated in the blockchain by the user accessing the blockchain is a transfer.

The asset object can include an intelligent asset object, and the intelligent asset object is used to maintain intelligent assets. The intelligent assets correspond to any type of real assets of the user in the real world, and the intelligent assets can be processed in the blockchain by using the intelligent asset object. For example, the intelligent asset object can be processed by using the smart contract in the blockchain. Types of the real assets of the user in the real world corresponding to the intelligent assets are not particularly limited in the present specification.

For example, if the blockchain is a consortium blockchain constituted by several financial institutions, in actual applications, offline assets of the user such as funds, house properties, stocks, loan contracts, bills, and receivables can be packed in a form of digital assets by a financial institution managing node devices in the consortium blockchain, and can be created and deployed in a distributed database of the consortium blockchain.

The following describes the technical solutions of the present specification in detail with reference to "blockchain object extension", "smart contract object deploy", "asset object creation", and "asset object combination and transfer" by using specific implementations.

(1) Blockchain Object Extension

In the present specification, when setting up a blockchain network, an operator of the blockchain can extend an object supported by the blockchain.

A conventional blockchain (for example, Ethereum) usually supports only an account object and a smart contract object. However, in the present specification, an object supported by the blockchain can be extended, and further includes an asset object in addition to the existing account object and smart contract object.

In other words, in the present specification, the blockchain can support an account object, a smart contract object, and an asset object. As such, in addition to creating an account and a smart contract in the blockchain, the user accessing the blockchain can further create a digital asset in the blockchain, to convert assets in the real world into digital assets deployed in the blockchain.

In a shown implementation, the object supported by the blockchain can still include four attribute fields: a balance field, a storage field, a code field, and a nonce field.

In the conventional blockchain (for example, Ethereum), the balance field (address field) usually indicates "balance", used to indicate the amount of tokens held by an object. However, in the present specification, the meaning of the balance field can be extended, and the balance field is used to maintain address information of the asset object held by the object rather than indicating "balance". In actual applications, the balance field can maintain address information of a plurality of asset objects.

During implementation, the account object, the smart contract object, and the asset object shown above can add address information of an asset object to the balance field, and hold the asset object corresponding to the address information. In other words, in addition to the account object and the smart contract object shown above, the asset object in the present specification can also hold virtual assets.

The storage field is used to maintain various declares of an object (for example, an account state, a contract state, and an asset state). If an asset object is used as an example, a financial institution deploying the asset object or another executor specified by the financial institution and having the right of updating the asset object can update a state of the asset object by modifying content in the storage field. For example, if the asset object is digital assets obtained by packing offline loan contract assets of the user, when a daily loan repayment state of the user changes, the financial institution deploying the asset object or another executor specified by the financial institution and having the right of updating the asset object can synchronously update the content in the storage field in the asset object corresponding to the digital assets as the daily loan repayment state of the user changes.

The code field is used to maintain execution code (for example, various executable methods related to the code) related to an execution program declared in an object. In other words, in the present specification, the account object, the smart contract object, and the asset object shown above can declare a related execution program in the object.

For example, if a smart contract object is used to manage an asset object, any operation related to the asset object managed by the smart contract object can be declared in advance in the code field of the smart contract object in a form of the execution program. The execution program can be directly invoked subsequently to complete the corresponding operation. For example, the execution program declared in the smart contract object used to manage the asset object can usually include an execution program used to create an asset object, an execution program used to update an asset object, an execution program used to transfer an asset object, etc.

It is worthwhile to that in addition to maintaining the execution code related to the execution program declared in the object, the code field can also maintain an invoking address of the smart contract object, an invoking parameter that needs to be transferred when the smart contract object is invoked, etc.

The nonce field is used to maintain a count for preventing a replay attack in the blockchain. The count can be usually a random number or a pseudo-random number used to prevent the replay attack in the blockchain.

(2) Smart Contract Object Deploy

In a shown implementation, the blockchain can be a consortium blockchain constituted by several financial institutions serving as consortium members. In this case, the target member in the blockchain can be a financial institution serving as a consortium member in the consortium blockchain and having the right of creating an asset object.

A distributed smart contract platform can be set up by using the consortium blockchain, and the financial institution having the right of creating an asset object in the consortium blockchain can create a new asset type in the platform by deploying a smart contract (smart contract object) in the consortium blockchain.

During implementation, each financial institution in the consortium blockchain can first register as a consortium member of the consortium blockchain, to obtain a public key and a private key returned by the consortium blockchain. The public key is used as an account address of each financial institution in the consortium blockchain, and the private key is used as a unique key used by each financial institution to operate the account. Then, all financial institutions joining the consortium blockchain can be simultaneously authorized by the operator of the consortium blockchain to create an asset object. When authorized to create an asset object, the financial institution can create and deploy a smart contract in the consortium blockchain based on actual needs, to create a new asset type.

A specific process of deploying the smart contract by the financial institution in the consortium blockchain is not described in detail in the present specification, and a person skilled in the art can refer to records in related technologies.

For example, in actual applications, the financial institution can deploy a transfer to the consortium blockchain based on the held private key, to deploy the created smart contract to the consortium blockchain. When receiving, by using managed node devices, a transfer deployed by another financial institution, each consortium member in the consortium blockchain can perform, based on a consensus algorithm of the consortium blockchain, consensus processing on transfers recently deployed in the consortium blockchain, and record a smart contract deployed by the transfer in the distributed database of the consortium blockchain after completing the consensus processing. The consensus algorithm supported by the consortium blockchain and the consensus processing process performed by the consortium blockchain based on the consensus algorithm are not described in detail in the present specification, and a person skilled in the art can refer to records in related technologies.

In the present specification, a smart contract corresponding to a new asset type and deployed by the financial institution in the consortium blockchain can declare in advance an execution program related to the asset type corresponding to the smart contract. The execution program declared in advance can be included in the code field of the smart contract object corresponding to the smart contract.

In a shown implementation, the execution program declared in the smart contract corresponding to the new asset type and deployed by the financial institution in the consortium blockchain can include an execution program used to create an asset object and an execution program used to transfer an asset object. The user accessing the consortium blockchain can invoke an API interface provided by the consortium blockchain to deploy, to the consortium blockchain, a transfer signed based on the held private key, and invoke the execution program declared in the smart contract, to create virtual assets and complete online transfer of the held virtual assets.

In some implementations, in addition to the described execution programs used to create and transfer asset objects, the execution program declared in the smart contract corresponding to the new asset type and deployed by the financial institution in the consortium blockchain can further include other execution programs related to the asset object, for example, an execution program used to update an asset object. No enumeration is provided in the present specification for simplicity.

(3) Asset Object Creation

In the present specification, a user who needs to access a blockchain can pre-register with a consortium blockchain to obtain a public key and a private key returned by the consortium blockchain. After registration, the consortium blockchain can create a corresponding account object for the user.

In addition, a registered user can deploy, to the consortium blockchain through an API interface provided by the consortium blockchain, a transfer that is signed based on the held private key and that is used to request to create an asset object.

After receiving the transfer deployed by the user based on the private key, a node device in the consortium blockchain connected to the registered user can first perform identity authentication on the user based on a public key corresponding to the private key held by the user. For example, in actual applications, a user can sign an initiated transfer based on a held private key, and a node device in a blockchain performs signature authentication based on a public key corresponding to the private key held by the user. If signature authentication succeeds, identity authentication on the user succeeds.

After identity authentication succeeds, consensus processing can be performed on transfers received within a period of time based on a consensus algorithm, and the transfer can be performed after consensus processing, to determine a type of an asset object that the user requests to create (the consortium blockchain can deploy a plurality of smart contract objects corresponding to different asset object types, but the user can request to create a particular type of asset object).

For example, in an implementation, a type of an asset object that requests to be created can be declared in the transfer deployed by the user based on the held private key, and the node device receiving the transfer can determine, based on information declared in the transfer, the type of the asset object that the user currently requests to create.

After determining the type of the asset object that the user requests to create, the node device can further query a smart contract object that is deployed in the consortium blockchain and that corresponds to the type of the asset object that the user requests to create, and then can invoke, based on an invoking address of the smart contract object, an execution program that is declared in the smart contract object and that is used to create an asset object, to complete asset object creation.

For example, in an implementation, the transfer deployed by the user based on the held private key can further include parameters related to the asset object that requests to be created, for example, an asset amount that requests to be created. In response to invoking the previous smart contract object, the node device can transfer the parameters as invoking parameters to the execution program that is declared in the smart contract object and that is used to create an asset object, and perform invoking execution to complete asset object creation.

In a shown implementation, after creating the asset object for the user by using the shown process, the node device can further add address information of the created asset object to a balance field of a target object holding the asset object.

A process of generating the address information of the previous asset object is not particularly limited in the present specification. For example, in an implementation, the address information of the asset object can be a hash value obtained through hash calculation for transfer content of the asset object that requests to be created.

In a shown implementation, a target object eventually holding the created asset object includes the following two cases:

Situation 1: The target object eventually holding the created asset object can be a target object that is specified by the user and that is used to hold the asset object.

For example, during implementation, the user can declare, in advance in a deployed transfer for requesting asset object creation, a target object that can hold a newly created asset object; or the user can notify, through offline notification, a financial institution that deploys the asset object of a specified target object holding the created asset object.

Situation 2: The target object eventually holding the created asset object can be the target object that is declared in the previous smart contract object in advance and that is used to hold the asset object. In other words, a target object that can hold an asset object created by invoking the smart contract object can be declared in the smart contract object in advance when the previous financial institution deploys the smart contract object.

For example, a whitelist of target objects that can hold an asset object created by invoking the smart contract object can be declared in the smart contract object in advance when the previous financial institution deploys the smart contract object. A target object that hits the whitelist can hold the asset object created by invoking the previous smart contract object.

In a shown implementation, the created asset object can be eventually held by any one of an account object, a smart contract object, and an asset object supported by the consortium blockchain. In other words, in the present specification, all the account object, the smart contract object, and the asset object supported by the consortium blockchain can hold an asset object. The created asset object can be held by any one of the account object, the smart contract object, and the asset object, which can be specified by the user or can be declared in the smart contract object.

For example, the user can specify asset object A as a target object holding created asset object B, and then can add address information of asset object B to a balance field of asset object A, to complete packing processing of asset object A and asset object B.

(4) Asset Object Combination and Transfer

In the present specification, a registered user can deploy a transfer used to request to create an asset object and signed based on a held private key to a consortium blockchain through an API interface provided by the consortium blockchain, to initiate asset object creation. In addition, in actual applications, the user can also deploy a transfer used to transfer an asset object and signed based on the held private key to the consortium blockchain through the API interface, to combine and transfer a plurality of held asset objects.

It is worthwhile to note that asset types corresponding to the plurality of asset objects that the user requests to combine can be the same or different, which is not limited in the present specification. In other words, in the present specification, the user can combine and transfer, by initiating a transfer, a plurality of asset objects of the same asset type created by invoking the same smart contract object, or can combine and transfer a plurality of asset objects of different asset types created by invoking different smart contract objects.

After receiving the transfer deployed by the user based on the private key, a node device in the consortium blockchain connected to the registered user can first perform identity authentication on the user based on a public key corresponding to the private key held by the user. After the identity authentication succeeds, the node device can perform consensus processing on transfers received within a period of time based on a consensus algorithm, and execute the transfer after the consensus processing is completed, to determine the plurality of asset objects that the user needs to combine and transfer.

For example, in an implementation, the transfer deployed by the user based on the held private key can declare address information or other identification information of the plurality of asset objects that the user requests to transfer, and a node device receiving the transfer can determine the target asset object that the user currently requests to transfer, based on the information declared in the transfer. After the node device determines the plurality of asset objects that the user requests to transfer, an asset combination procedure supported by the consortium blockchain can be enabled, and the plurality of asset objects are combined into the target asset object.

In a shown implementation, the plurality of asset objects that needs to be combined in the user statement in the transfer can include the target asset object specified by the user, and one or more asset objects other than the target asset object in the plurality of asset objects can be held in the target asset object, so that the plurality of asset objects can be "packed" into the target asset object to complete combination of the plurality of asset objects.

In this case, in response to combining the plurality of asset objects during transfer, the node device can add address information of one or more asset objects other than the specified target asset object in the plurality of asset objects to the balance field in the target asset object, so as to combine the plurality of asset objects into the target asset object.

In a shown implementation, the user also can not specify the target asset object in the plurality of asset objects, but can declare in the transfer the asset type of the target asset object that needs to hold the plurality of asset objects, so as to "pack" the plurality of asset objects into the target asset object corresponding to the asset type specified by the user.

In this case, in response to combining the plurality of asset objects during transfer, the node device can invoke the smart contract object corresponding to the asset type specified by the user, to create one target asset object holding the plurality of asset objects, and then add the address information of the plurality of asset objects to the balance field in the target asset object, so as to combine the plurality of asset objects into the target asset object.

In the present specification, after combining the plurality of asset objects into the target asset object, the node device can remove the address information of the plurality of asset objects from the balance fields of the target objects holding the plurality of asset objects, and add the address information of the target asset object obtained after combination to the balance field in the asset receiving object corresponding to the target asset object.

It is worthwhile to note that in the present specification, the user can transfer the held asset object in the consortium blockchain by initiating a transfer in the following two methods:

In a shown implementation, a transfer type used for virtual asset transfer can be described in the consortium blockchain, and the user can transfer, by initiating the described transfer type used for virtual asset transfer in the consortium blockchain, the asset object in the consortium blockchain without invoking the smart contract object. The node device that performs the type of transfer removes address information of the plurality of target asset objects from balance fields of the target objects holding the plurality of asset objects, and adds the address information of the target asset object to a balance field in an asset receiving object corresponding to the target asset object.

In another shown implementation, an asset object can be transferred by the user by invoking a smart contract object corresponding to an asset type of the asset object. In this case, an execution program used to transfer an asset object can be declared in the smart contract object in advance, and a transfer rule is described in advance in the execution program.

The transfer rule can be some asset transfer conditions declared in the smart contract object. A person skilled in the art can customize specific content of the previous asset transfer condition based on actual needs. For example, the previous asset transfer condition can be that a user who initiates a transfer can complete asset object transfer when the user belongs to a specified user group declared in the smart contract object.

Execution logic corresponding to the execution program used to transfer an asset object is not particularly limited in the present specification, and can be customized by a person skilled in the art based on actual needs. For example, in some cases, the previous execution program can be execution code for stating an asset transfer condition in advance in a code field in the smart contract object.

When the user requests to transfer an asset object created by invoking the previous smart contract in the consortium blockchain, the user can initiate, to the smart contract object in the consortium blockchain, a transfer used to transfer an asset object, to serve as input of the smart contract object; then invoke, based on an invoking address of the smart contract object corresponding to the target asset object, an execution program declared in the smart contract object and used to transfer an asset object; and determine whether the transfer used to transfer an asset object and initiated by the user satisfies the transfer rule described in the previous execution program. If yes, the node device can remove the address information of the plurality of target asset objects from the balance fields of the target objects holding the plurality of asset objects, and add the address information of the target asset object to the balance field in the asset receiving object corresponding to the target asset object.

In a shown implementation, the asset receiving object corresponding to the target asset object can also include the following two cases:

Situation 1: The asset receiving object corresponding to the target asset object can be an asset receiving object that is specified by the user and that corresponds to the target asset object.

For example, during implementation, the user can declare the asset receiving object corresponding to the target asset object in advance in the deployed transfer used to request asset object transfer; or the user can notify a financial institution that deploys the asset object of the asset receiving object corresponding to the target asset object through offline notification.

Situation 2: The asset receiving object corresponding to the target asset object can be an asset receiving object that is declared in the smart contract object in advance and that corresponds to the target asset object. In other words, when the previous mentioned financial institution deploys the smart contract object, the smart contract object can declare in advance a receiving object that can hold a packed target asset object when target asset objected is packed and transferred.

In a shown implementation, the asset receiving object corresponding to the target asset object can include any one of an account object, a smart contract object, and an asset object supported by the consortium blockchain. In other words, in the present specification, a target asset object to be transferred can be transferred to any one of the account object, the smart contract object, and the asset object supported by the previous consortium blockchain, so that the target asset object can be held.

It is worthwhile to note that a list of users having the invoking right to the smart contract object usually can be further declared in the previous smart contract object in some scenarios. Therefore, after receiving the transfer deployed by the user based on the private key, the node device in the blockchain can further verify whether the user has an invoking right to the smart contract object during identity authentication; determine that the user has the invoking right to the smart contract object if authentication succeeds; and then invoke the execution program declared in the smart contract object and used to create or transfer an asset object, to complete asset object creation and transfer.

For example, the list of users having an invoking right to the smart contract object declared in the smart contract object can be a list of public keys held by the user. After receiving the transfer deployed by the user based on the private key, the node device in the blockchain can perform identity authentication on the user based on public keys in the public key list. If authentication succeeds, it indicates that the user has the invoking right to the smart contract object.

In some implementations, in actual applications, whether a user who submits a transfer has an invoking right to the smart contract object can further be determined by using methods other than performing identity authentication on the user based on a public key held by the user. No enumeration is provided in the present specification. It can be learned from the previous implementations that in the present specification, the plurality of asset objects specified by a user are combined into the target asset object, the address information of the plurality of asset objects is removed from the target objects holding the plurality of asset objects, and the address information of the target asset object is added to the receiving object holding the target asset object, to transfer the target asset object, so that assets in the real world can be converted into digital assets in the blockchain and held, and online combination and transfer of the assets can be completed based on the blockchain.

Figure 2:
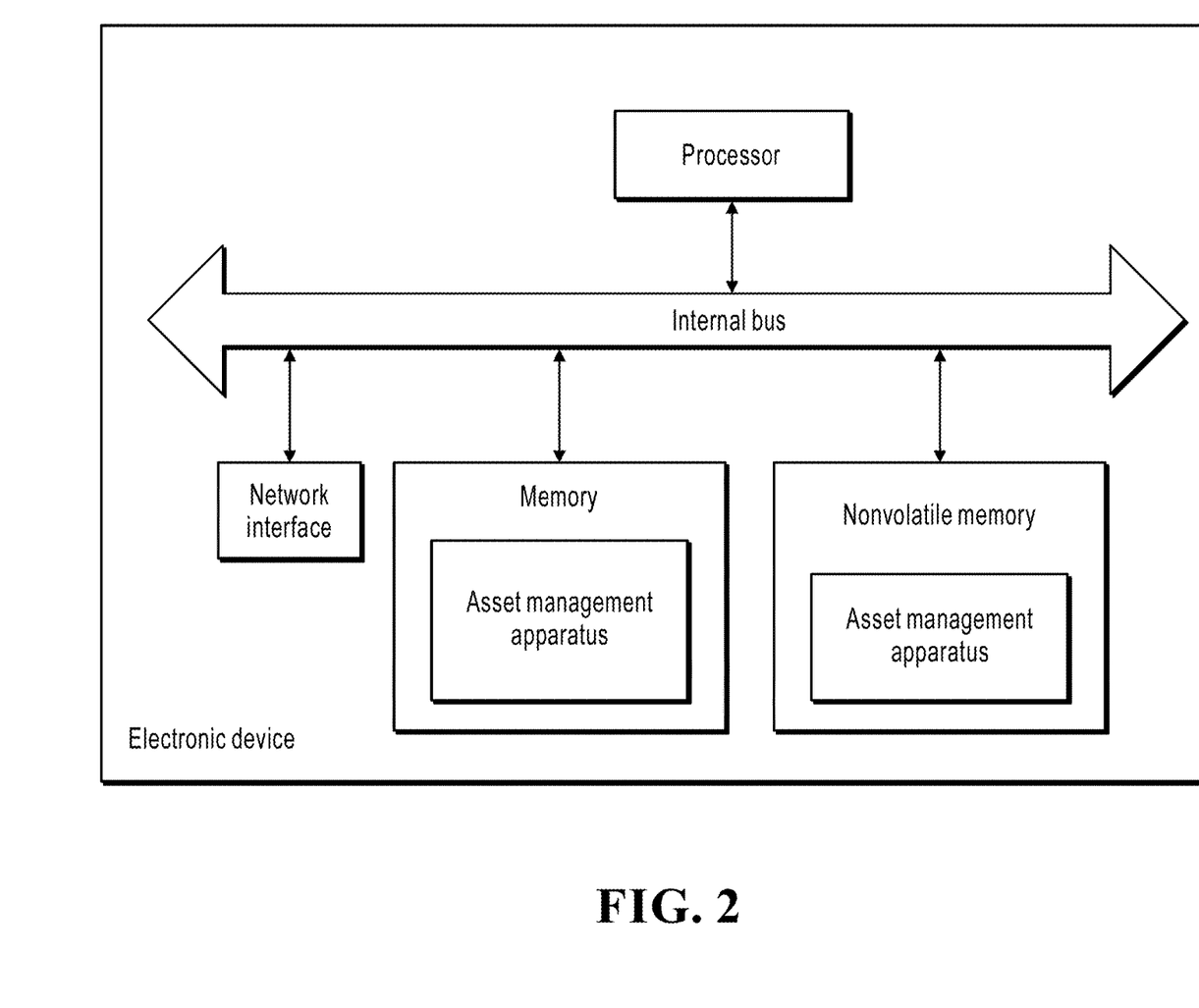
FIG. 2 is a schematic structural diagram illustrating an electronic device, according to an example implementation.

Corresponding to the previous method implementation, the present specification further provides an implementation of an asset management apparatus. The implementation of the asset management apparatus in the present specification can be applied to an electronic device. The apparatus implementation can be implemented by using software, hardware, or a combination of hardware and software. Software implementation is used as an example. As a logic device, the device is formed by reading a corresponding computer program instruction in a nonvolatile memory to a memory by a processor of the electronic device that the device is located in. In terms of hardware, FIG. 2 is a hardware structural diagram illustrating an electronic device that an asset management apparatus is located in, according to the present specification. In addition to a processor, a memory, a network interface, and a nonvolatile memory shown in FIG. 2, the electronic device that the apparatus in the present implementation is located in usually can include other hardware based on an actual function of the electronic device. Details are omitted here for simplicity.

Figure 3:
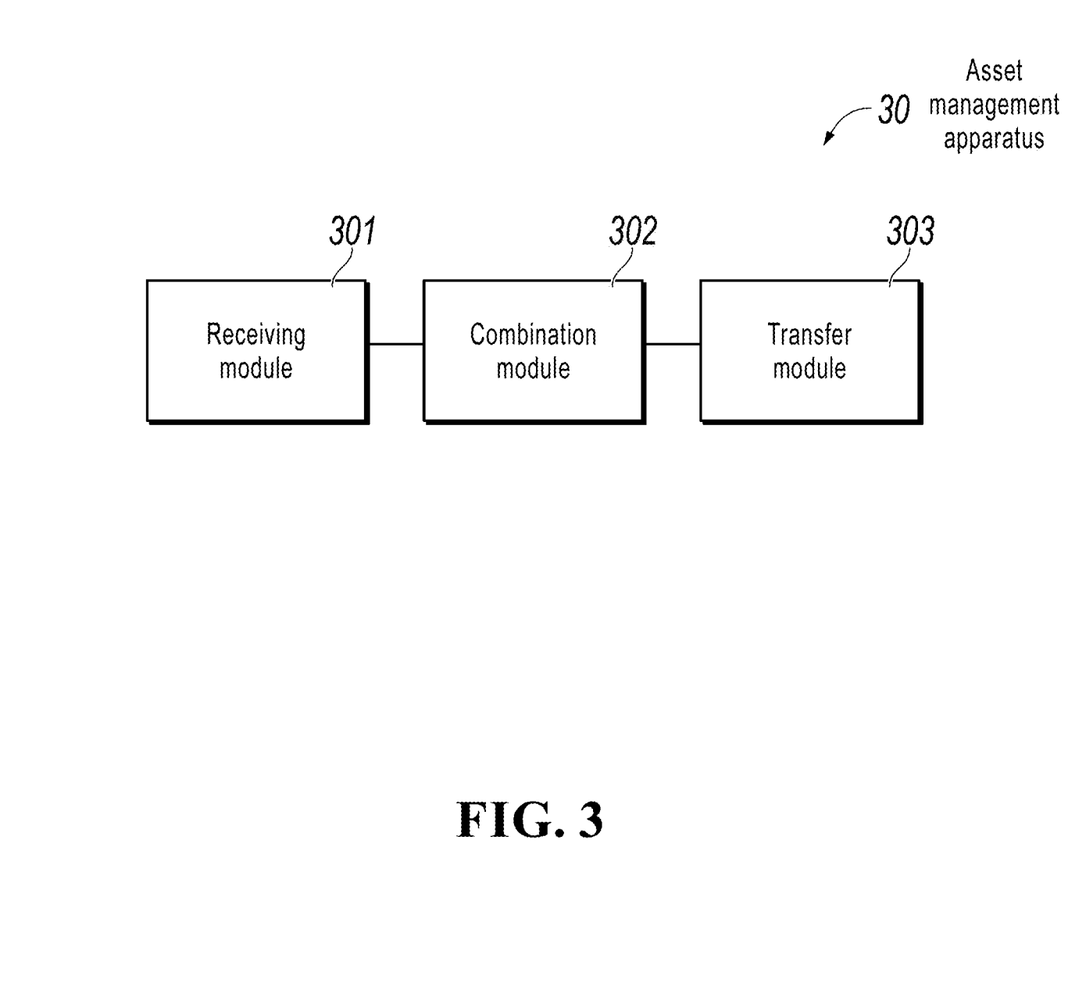
FIG. 3 is a block diagram illustrating an asset management apparatus, according to an example implementation.

FIG. 3 is a block diagram illustrating an asset management apparatus, according to an example implementation of the present specification.

Referring to FIG. 3, the asset management apparatus 30 can be applied to the electronic device shown in FIG. 2, and include a receiving module 301, a combination module 302, and a transfer module 303.

The receiving module 301 is configured to enable a node device in a blockchain to receive an asset object transfer request, where the asset object transfer request includes a plurality of asset objects to be transferred.

The combination module 302 is configured to, in response to the asset object transfer request, combine the plurality of asset objects into a target asset object.

The transfer module 303 is configured to remove address information of the plurality of asset objects from target objects holding the plurality of asset objects, and add address information of the target asset object to asset receiving objects corresponding to the plurality of asset objects.

In the present implementation, the plurality of asset objects includes the target asset object specified by a target user.

The combination module 302 is configured to: add address information of one or more asset objects other than the target asset object in the plurality of asset objects to the target asset object.

In the present implementation, the asset object transfer request includes an asset type specified by a target user, and a smart contract object corresponding to the specified asset type is deployed in the blockchain.

The combination module 302 is configured to: invoke the smart contract object corresponding to the asset type specified by the target user, to create the target asset object; and add the address information of the plurality of asset objects to the target asset object.

In the present implementation, a smart contract object corresponding to an asset type of the target asset object is deployed in the blockchain, the smart contract object declares an execution program used to transfer an asset object, and the target asset object is created by invoking the corresponding smart contract object.

The transfer module 303 is configured to: invoke the execution program declared in the smart contract object that corresponds to the asset type of the target asset object and that is deployed in the blockchain, and determine whether the asset object transfer request satisfies a predetermined transfer rule; and if the asset object transfer request satisfies the predetermined transfer rule, remove the address information of the plurality of asset objects from the target objects holding the plurality of asset objects, and add the address information of the target asset object to an asset receiving object corresponding to the target asset object.

In the present implementation, an object supported by the blockchain includes an address field, and the address field is used to maintain address information of an asset object held by the object. The transfer module 303 is further configured to: remove the address information of the plurality of asset objects from the address fields in the target objects holding the plurality of asset objects, and add the address information of the target asset object to an address field in an asset receiving object corresponding to the target asset object.

In the present implementation, an object supported by the blockchain further includes a code field, and the code field is used to maintain execution code related to an execution program declared in the object.

In the present implementation, an asset receiving object corresponding to the target asset object includes: an asset receiving object that is specified by a user and that corresponds to the target asset object; or an asset receiving object that is declared in a smart contract object corresponding to an asset type of the target asset object and that corresponds to the target asset object.

In the present implementation, an object supported by the blockchain includes an account object, a smart contract object, and an asset object; and the asset-receiving object corresponding to the target asset object includes any one of an account object, a smart contract object, and an asset object.

In the present implementation, the blockchain is a consortium blockchain, and a target member in the blockchain is a consortium member having the right of creating an asset object in the consortium blockchain.

For specific implementation processes of functions and roles of the modules in the apparatus, refer to implementation processes of corresponding steps in the method. Details are omitted here for simplicity.

Because an apparatus implementation basically corresponds to a method implementation, for related parts, refer to partial descriptions in the method implementation. The described apparatus implementation is merely an example. The modules described as separate parts can or cannot be physically separate, and parts displayed as modules can or cannot be physical modules, in other words, can be located in one position, or can be distributed in a plurality of network modules. A part or all of the modules can be selected based on actual needs to achieve the objectives of the solutions of the present specification. A person of ordinary skill in the art can understand and implement the implementations of the present specification without creative efforts.

The system, apparatus, module, or unit illustrated in the previous implementations can be implemented by using a computer chip or an entity, or can be implemented by using a product having a particular function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or a combination thereof.

Corresponding to the previous method implementation, the present specification further provides an implementation of an electronic device. The electronic device includes a processor and a memory configured to store an executable machine instruction. The processor and the memory are usually connected to each other by using an internal bus. In another possible implementation, the device can further include an external interface, so as to communicate with another device or component.

In the present implementation, by reading and executing an executable machine instruction that is stored in the memory and that corresponds to control logic of asset management, the processor is configured to: receive an asset object transfer request, where the asset object transfer request includes a plurality of asset objects to be transferred; and in response to the asset object transfer request, combine the plurality of asset objects into a target asset object, remove address information of the plurality of asset objects from target objects holding the plurality of asset objects, and add address information of the target asset object to asset receiving objects corresponding to the plurality of asset objects.

In the present implementation, the plurality of asset objects includes the target asset object specified by a target user.

By reading and executing an executable machine instruction that is stored in the memory and that corresponds to control logic of asset management, the processor is configured to: add address information of one or more asset objects other than the target asset object in the plurality of asset objects to the target asset object.

In the present implementation, the asset object transfer request includes an asset type specified by a target user, and a smart contract object corresponding to the specified asset type is deployed in the blockchain.

By reading and executing an executable machine instruction that is stored in the memory and that corresponds to control logic of asset management, the processor is configured to: invoke the smart contract object corresponding to the asset type specified by the target user, to create the target asset object; and add the address information of the plurality of asset objects to the target asset object.

In the present implementation, a smart contract object corresponding to an asset type of the target asset object is deployed in the blockchain, the smart contract object declares an execution program used to transfer an asset object, and the target asset object is created by invoking the corresponding smart contract object.

By reading and executing an executable machine instruction that is stored in the memory and that corresponds to control logic of asset management, the processor is configured to: invoke the execution program declared in the smart contract object that corresponds to the asset type of the target asset object and that is deployed in the blockchain, and determine whether the asset object transfer request satisfies a predetermined transfer rule; and if the asset object transfer request satisfies the predetermined transfer rule, remove the address information of the plurality of asset objects from the target objects holding the plurality of asset objects, and add the address information of the target asset object to an asset receiving object corresponding to the target asset object.

In the present implementation, an object supported by the blockchain includes an address field, and the address field is used to maintain address information of an asset object held by the object.

By reading and executing an executable machine instruction that is stored in the memory and that corresponds to control logic of asset management, the processor is configured to: remove the address information of the plurality of asset objects from the address fields in the target objects holding the plurality of asset objects, and add the address information of the target asset object to an address field in an asset receiving object corresponding to the target asset object.

A person skilled in the art can easily figure out another implementation of the present specification after considering the present specification and practicing the present specification. The present specification is intended to cover any variations, functions, or adaptive changes of the present specification. These variations, functions, or adaptive changes comply with general principles of the present specification, and include common knowledge or a commonly used technical means in the technical field that is not disclosed in the present specification. The present specification and the implementations are merely considered as examples, and the actual scope and the spirit of the present specification are described by the following claims.

It should be understood that the present specification is not limited to the earlier described structures that are shown in the accompanying drawings, and modifications and changes can be made without departing from the scope of the present specification. The scope of the present specification is limited only by the appended claims.

The previous descriptions are merely example implementations of the present specification, but are not intended to limit the present specification. Any modification, equivalent replacement, or improvement made without departing from the spirit and principle of the present specification should fall within the protection scope of the present specification.

Figure 4:
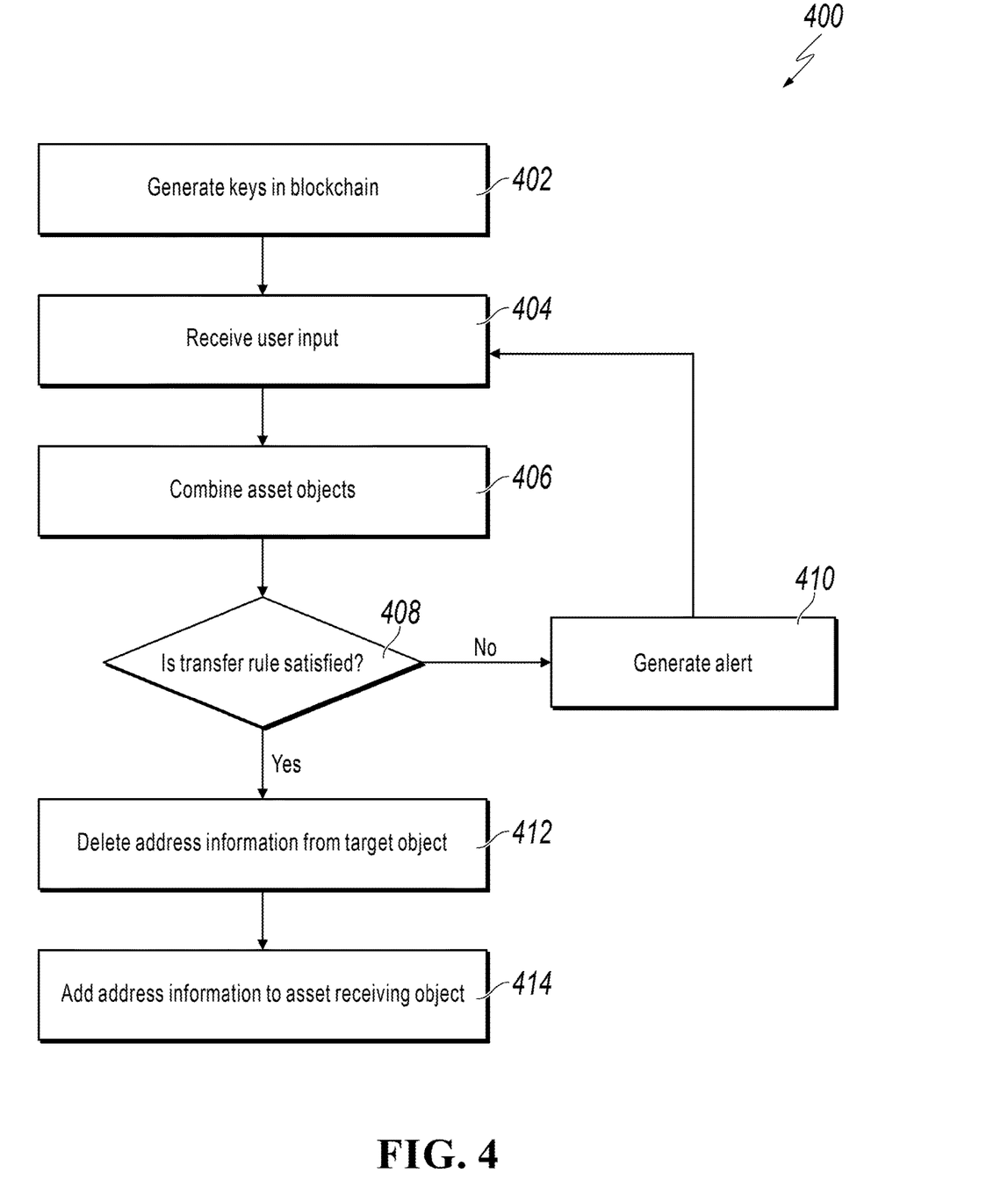
FIG. 4 is a flowchart illustrating an example of a computer-implemented method for asset management, according to an implementation of the present disclosure.

FIG. 4 is a flowchart illustrating an example of a computer-implemented method 400 for asset management, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, a public key and a private key are generating for a target user recorded in a distributed database of a blockchain network. In some implementations, the public key is associated with an account address of an institution in the blockchain network and the private key is configured to be used by the institution to operate the account. In some implementations, the blockchain network includes a consortium chain, and the target member (user) in the blockchain network is a consortium member that has asset object generation authority in the consortium chain. The blockchain network includes one or more account objects and one or more contract objects. The objects of the blockchain network (e.g., account objects, contract objects, target objects, and asset objects) include one or more fields. For example, the fields can include one or more of the following: the IP configuration for the target user; DNS logs from the target user, including events such as DNS lookups, changes to DNS settings, and so forth; network firewall logs (and/or other security-related log files) from the target user, including events such as blocked or allowed network communications, and so forth; operating system (OS) logs from the target user, including events associated with the OS; port settings on the target user; user access logs from the target user, including successful and/or unsuccessful user attempts to transfer assets from or to the target user; and/or user privilege data from the target user, including particular access privileges for various users on the target user. The fields can also include one or more of an entity name, entity ID, target user ID, OS version information, and software version(s) for installed software, network router information, other DNS settings, firewall settings, port settings, IP whitelist and/or blacklist settings, and so forth. From 402, method 400 proceeds to 404.

At 404, a user input is received from the target user. The user input includes a request to transfer a plurality of asset objects including digital assets corresponding to physical assets associated with the target user. The request includes an asset type specified by the target user. From 404, method 400 proceeds to 406.

At 406, in response to receiving the request, the plurality of asset objects are combined in a target object. The target object includes an address field used to maintain address information of the plurality of asset objects by deploying a contract object corresponding to the asset type in the blockchain network to create the target object. The contract object includes an execution program configured to generate the asset object and a code field that is used to maintain an execution code related to the execution program. From 406, method 400 proceeds to 408.

At 408, a determination is made as to whether the asset transfer request satisfies a predetermined transfer rule. The predetermined transfer rule can include one or more parameters configured to protect the security and confidentiality of the target user and other users of the blockchain. For example, the transfer rule can include asset transference requirements defined by the contract object. The asset transference requirements can define parameters associated with the asset for transaction and the users that perform or are the recipients of the transaction. In some implementations, the user parameters can identify user groups associated with the objects of the blockchain. If it is determined that the asset transfer request does not satisfy the predetermined transfer rule, method 400 proceeds to 410. At 410, an alert is generated to indicate that the asset transfer request does not satisfy the predetermined transfer rule. From 410, method 400 returns to 406.

Otherwise, at 412, if it is determined that the asset transfer request satisfies the predetermined transfer rule, the address information of the asset object is deleted from the target object (e.g., a field of the target object) that holds the asset object. From 412, method 400 proceeds to 414.

At 414, the address information of the target object is added to an asset-receiving object that corresponds to the asset object. The asset-receiving object can be identified by the contract object based on the asset type of the asset object and can be associated to the target object (e.g., both asset-receiving object and target object belonging to a particular group of objects). After 414, method 400 stops.

Implementations of the present application can solve technical problems in managing assets in a blockchain. In some implementations, the blockchain is a distributed storage solution that provides immutable and tamper-resistant data transfer and storage, and the data is stored in a database of the blockchain in an encrypted form. Such security measures ensure that that system state data stored on the blockchain is not corrupted or altered by malicious processes. For example, an alteration of an asset-receiving object can be a tactic used by an attacker when a target user is compromised for fraudulent purposes, and storage of system state data on an immutable blockchain prevents the use of that tactic by an attacker. In some implementations, the blockchain headers from different payment applications across entities are cross-Merkelized or otherwise processed on the blockchain to further ensure the integrity of the data stored in the database of the blockchain.

In consideration of security and confidentiality, contract objects can be configured to perform privacy protection processing on the data associated with the asset object before generating the asset object and sending the address information to other platforms for processing. In addition, the asset transfer operation is configured such that it does not affect the overall data volume within the blockchain network by deleting a data volume from a first location when adding the corresponding data volume in a second location. As such, the asset transfer operation does not lead to an exponential increase of data volume, which is a common problem associated with conventional methods of asset management.

Implementations of the present application provide methods and apparatuses for improving asset management. In some implementations, a processing platform (e.g., an payment processing server) obtains data that is to be validated and that corresponds to a predetermined feature from a data providing platform as a data group that is to be validated (e.g., a data group that corresponds to user transaction amounts). In addition, the processing platform can further obtain additional (e.g., historical) data associated with the asset that is to be validated by the predetermined transfer rule. The historical data may also corresponds to the same predetermined feature, and the comparison data group can be provided to a processing platform (e.g., a node of the blockchain network) for processing before the asset transfer. Then, the processing platform determines whether the asset transfer request satisfies the predetermined transfer rule. If the predetermined transfer rule is satisfied (e.g., there is no abnormal data), the processing platform can continue to transfer the asset. If the processing platform determines that there is abnormal data, the processing platform can start alerting, instruct related persons to analyze the cause of the data exception, and trigger related solutions.

In some implementations, the processing platform determines risk scores of asset transfers and transactions across multiple different entities, based on both transaction data for the transaction and system state data for the hosts involved in handling the transaction. The risk scores are examined to identify those transactions that are deemed high risk, with above-threshold scores. Such transactions can be blocked or queued for further examination in a case management system, for example. The system state data to be used for comparison, as well as the transaction data and risk score(s), can be stored on the blockchain that provides immutable, secure, and distributed data storage. Use of the blockchain facilitates the collection and analysis of a large amount of transaction data and system state data, which may grow over time as transaction traffic increases and/or transaction networks expand by adding more hosts to accommodate the increased traffic. Accordingly, through the use of a blockchain to store and analyze the data, implementations provide scalability with respect to the data extraction, analysis, and storage of the data. Moreover, because the blockchain is distributed across multiple network locations, implementations avoid the use of a centralized database for data storage and are therefore less vulnerable to corruption or deletion by malicious processes, in comparison to traditional, previously available risk analysis solutions that are vulnerable to attack at such a centralized storage hub.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for asset management, the method comprising:
    receiving, from a target user recorded in a distributed database of a blockchain network, a user input comprising a request to transfer a plurality of asset objects of a plurality of different asset types, the plurality of asset objects being created by invoking of a plurality of smart contract objects and comprising digital assets corresponding to physical assets associated with the target user, wherein the physical assets comprise at least two items selected from a list comprising a fund, a house property, a stock, a loan contract, a bill, and a receivable item, and wherein each smart contract object of the plurality of smart contract objects corresponds to a respective asset type of the plurality of different asset types;
    in response to receiving the request, combining the plurality of asset objects of the plurality of different asset types in a target object, the target object comprising an address field used to maintain address information of the plurality of asset objects and corresponding to an asset type specified in the request;
    retrieving historical data associated with a predetermined feature of the plurality of asset objects, wherein the historical data is to be validated by a predetermined transfer rule and the predetermined transfer rule is configured to protect a security and a confidentiality of the target user;
    determining based on processing the historical data that the request satisfies the predetermined transfer rule;
    in response to determining that the request satisfies the predetermined transfer rule, deleting the address information corresponding to the plurality of asset objects from the target object; and
    adding the address information to asset receiving objects corresponding to the plurality of asset objects.

2. The computer-implemented method of claim 1, wherein the request comprises an asset type specified by the target user.

3. The computer-implemented method of claim 2, further comprising deploying a contract object corresponding to the asset type in the blockchain network to create the target object.

4. The computer-implemented method of claim 3, wherein the contract object comprises an execution program configured to generate the target object and a code field that is used to maintain an execution code related to the execution program.

5. The computer-implemented method of claim 1, wherein the blockchain network comprises a consortium chain, and the target user in the blockchain network is a consortium member that has asset object generation authority in the consortium chain.

6. The computer-implemented method of claim 1, further comprising:
    determining whether the request satisfies the predetermined transfer rule; and
    in response to determining that the request satisfies the predetermined transfer rule, deleting the address information from the target object and adding the address information to an asset receiving object that corresponds to a respective asset object.

7. The computer-implemented method of claim 1, further comprising generating for the target user a public key associated with an account address of an institution in the blockchain network and a private key configured to be used by the institution to operate an account.

8. A non-transitory, computer-readable medium storing one or more instructions executable by a computer system to perform operations comprising:

receiving, from a target user recorded in a distributed database of a blockchain network, a user input comprising a request to transfer a plurality of asset objects of a plurality of different asset types, the plurality of asset objects being created by invoking of a plurality of smart contract objects and comprising digital assets corresponding to physical assets associated with the target user, wherein the physical assets comprise at least two items selected from a list comprising a fund, a house property, a stock, a loan contract, a bill, and a receivable item, and wherein each smart contract object of the plurality of smart contract objects corresponds to a respective asset type of the plurality of different asset types;

in response to receiving the request, combining the plurality of asset objects of the plurality of different asset types in a target object, the target object comprising an address field used to maintain address information of the plurality of asset objects and corresponding to an asset type specified in the request;

retrieving historical data associated with a predetermined feature of the plurality of asset objects, wherein the historical data is to be validated by a predetermined transfer rule and the predetermined transfer rule is configured to protect a security and a confidentiality of the target user;

determining based on processing the historical data that the request satisfies the predetermined transfer rule;

in response to determining that the request satisfies the predetermined transfer rule, deleting the address information corresponding to the plurality of asset objects from the target object; and adding the address information to asset receiving objects corresponding to the plurality of asset objects.

9. The non-transitory, computer-readable medium of claim 8, wherein the request comprises an asset type specified by the target user.

10. The non-transitory, computer-readable medium of claim 9, wherein the operations further comprise deploying a contract object corresponding to the asset type in the blockchain network to create the target object.

11. The non-transitory, computer-readable medium of claim 10, wherein the contract object comprises an execution program configured to generate the target object and a code field that is used to maintain an execution code related to the execution program.

12. The non-transitory, computer-readable medium of claim 8, wherein the blockchain network comprises a consortium chain, and the target user in the blockchain network is a consortium member that has asset object generation authority in the consortium chain.

13. The non-transitory, computer-readable medium of claim 8, wherein the operations further comprise:

determining whether the request satisfies the predetermined transfer rule; and in response to determining that the request satisfies the predetermined transfer rule, deleting the address information from the target object and adding the address information to an asset receiving object that corresponds to a respective asset object.

14. The non-transitory, computer-readable medium of claim 8, wherein the operations further comprise generating for the target user a public key associated with an account address of an institution in the blockchain network and a private key configured to be used by the institution to operate an account.

15. A computer-implemented system, comprising:

one or more computers; and one or more computer memory devices interoperably coupled with the one or more computers and having tangible, non-transitory, machine-readable media storing one or more instructions that, when executed by the one or more computers, perform operations comprising:

receiving, from a target user recorded in a distributed database of a blockchain network, a user input comprising a request to transfer a plurality of asset objects of a plurality of different asset types, the plurality of asset objects being created by invoking of a plurality of smart contract objects and comprising digital assets corresponding to physical assets associated with the target user, wherein the physical assets comprise at least two items selected from a list comprising a fund, a house property, a stock, a loan contract, a bill, and a receivable item, and wherein each smart contract object of the plurality of smart contract objects corresponds to a respective asset type of the plurality of different asset types;

in response to receiving the request, combining the plurality of asset objects of the plurality of different asset types in a target object, the target object comprising an address field used to maintain address information of the plurality of asset objects and corresponding to an asset type specified in the request;

retrieving historical data associated with a predetermined feature of the plurality of asset objects, wherein the historical data is to be validated by a predetermined transfer rule and the predetermined transfer rule is configured to protect a security and a confidentiality of the target user;

determining based on processing the historical data that the request satisfies the predetermined transfer rule;

in response to determining that the request satisfies the predetermined transfer rule, deleting the address information corresponding to the plurality of asset objects from the target object; and adding the address information to asset receiving objects corresponding to the plurality of asset objects.

16. The computer-implemented system of claim 15, wherein the request comprises an asset type specified by the target user.

17. The computer-implemented system of claim 16, wherein the operations further comprise deploying a contract object corresponding to the asset type in the blockchain network to create the target object.

18. The computer-implemented system of claim 17, wherein the contract object comprises an execution program configured to generate the target object and a code field that is used to maintain an execution code related to the execution program.

19. The computer-implemented system of claim 15, wherein the blockchain network comprises a consortium chain, and the target user in the blockchain network is a consortium member that has asset object generation authority in the consortium chain.

20. The computer-implemented system of claim 15, wherein the operations further comprise:
- determining whether the request satisfies the predetermined transfer rule;
- in response to determining that the request satisfies the predetermined transfer rule, deleting the address information from the target object and adding the address information to an asset receiving object that corresponds to a respective asset object; and
- generating for the target user a public key associated with an account address of an institution in the blockchain network and a private key configured to be used by the institution to operate an account.

* * * * *